(12) United States Patent
Krebs et al.

(10) Patent No.: US 8,644,755 B2
(45) Date of Patent: Feb. 4, 2014

(54) METHOD AND SYSTEM FOR MANAGING LEARNING MATERIALS PRESENTED OFFLINE

(75) Inventors: Rouven Krebs, Weingarten (DE); Christian Hochwarth, Wiesloch (DE)

(73) Assignee: SAP AG, Walldorf (DE)

( * ) Notice: Subject to any disclaimer, the term of this patent is extended or adjusted under 35 U.S.C. 154(b) by 1247 days.

(21) Appl. No.: 12/242,630

(22) Filed: Sep. 30, 2008

(65) Prior Publication Data

US 2010/0094886 A1 Apr. 15, 2010

(51) Int. Cl.
*G09B 7/00* (2006.01)

(52) U.S. Cl.
USPC ........................................................ 434/362

(58) Field of Classification Search
USPC .......... 434/323, 350, 362, 365; 707/610, 758; 705/14.12; 715/702
See application file for complete search history.

(56) References Cited

U.S. PATENT DOCUMENTS

| | | |
|---|---|---|
| 4,599,692 A | 7/1986 | Tan et al. |
| 5,008,853 A | 4/1991 | Bly et al. |
| 5,310,349 A | 5/1994 | Daniels et al. |
| 5,395,243 A | 3/1995 | Lubin et al. |
| 5,584,699 A | 12/1996 | Silver |
| 5,623,661 A | 4/1997 | Hon |
| 5,675,802 A | 10/1997 | Allen et al. |
| 5,692,125 A | 11/1997 | Schloss et al. |
| 5,715,454 A | 2/1998 | Smith |
| 5,727,950 A | 3/1998 | Cook et al. |
| 5,788,508 A | 8/1998 | Lee et al. |
| 5,802,514 A | 9/1998 | Huber |
| 5,805,889 A | 9/1998 | Van De Vanter |
| 5,810,605 A | 9/1998 | Siefert |
| 5,820,386 A | 10/1998 | Sheppard, II |
| 5,823,781 A | 10/1998 | Hitchcock et al. |
| 5,852,812 A | 12/1998 | Reeder |
| 5,864,869 A | 1/1999 | Doak et al. |
| 5,881,315 A | 3/1999 | Cohen |

(Continued)

FOREIGN PATENT DOCUMENTS

| | | |
|---|---|---|
| EP | 1071253 | 1/2001 |
| GB | 2373625 | 9/2002 |

(Continued)

OTHER PUBLICATIONS

Notice of Allowance issued in U.S. Appl. No. 11/258,591 on Sep. 17, 2008; 4 pages.

(Continued)

*Primary Examiner* — Peter Egloff
(74) *Attorney, Agent, or Firm* — Fish & Richardson P.C.

(57) ABSTRACT

Managing offline presentation of learning material may include associating identification strings with various portions of the learning material. When a learner is presented with the learning materials, identification strings associated with the learning materials may also be presented to the learner. The progress of the learner with respect to the learning materials may be identified based on the identification strings.

14 Claims, 3 Drawing Sheets

(56) References Cited

U.S. PATENT DOCUMENTS

| | | |
|---|---|---|
| 5,904,485 A | 5/1999 | Siefert |
| 6,011,949 A | 1/2000 | Shimomukai |
| 6,014,134 A | 1/2000 | Bell et al. |
| 6,029,043 A | 2/2000 | Ho et al. |
| 6,091,930 A | 7/2000 | Mortimer et al. |
| 6,099,320 A | 8/2000 | Papadopoulos |
| 6,112,024 A | 8/2000 | Almond et al. |
| 6,112,049 A | 8/2000 | Sonnenfeld |
| 6,118,973 A | 9/2000 | Ho et al. |
| 6,134,552 A | 10/2000 | Fritz et al. |
| 6,148,338 A | 11/2000 | Lachelt et al. |
| 6,149,438 A | 11/2000 | Richard et al. |
| 6,149,441 A | 11/2000 | Pellegrino et al. |
| 6,157,808 A | 12/2000 | Hollingsworth |
| 6,162,060 A | 12/2000 | Richard et al. |
| 6,164,974 A | 12/2000 | Carlile et al. |
| 6,175,841 B1 | 1/2001 | Loiacono |
| 6,195,528 B1 | 2/2001 | Young et al. |
| 6,216,164 B1 | 4/2001 | Zaremba, Jr. |
| 6,243,692 B1 | 6/2001 | Floyd et al. |
| 6,285,993 B1 | 9/2001 | Ferrell |
| 6,302,698 B1 | 10/2001 | Ziv-El |
| 6,315,572 B1 | 11/2001 | Owens et al. |
| 6,322,366 B1 | 11/2001 | Bergan et al. |
| 6,334,779 B1 | 1/2002 | Siefert |
| 6,336,813 B1 | 1/2002 | Siefert |
| 6,341,291 B1 | 1/2002 | Bentley et al. |
| 6,347,333 B2 | 2/2002 | Eisendrath et al. |
| 6,347,943 B1 | 2/2002 | Fields et al. |
| 6,353,447 B1 | 3/2002 | Truluck et al. |
| 6,368,110 B1 | 4/2002 | Koenecke et al. |
| 6,370,355 B1 | 4/2002 | Ceretta et al. |
| 6,381,444 B1 | 4/2002 | Aggarwal et al. |
| 6,386,883 B2 | 5/2002 | Siefert |
| 6,397,036 B1 | 5/2002 | Thean et al. |
| 6,398,556 B1 | 6/2002 | Ho et al. |
| 6,409,514 B1 | 6/2002 | Bull |
| 6,430,563 B1 | 8/2002 | Fritz et al. |
| 6,470,171 B1 | 10/2002 | Helmick et al. |
| 6,471,521 B1 | 10/2002 | Dornbush et al. |
| 6,473,794 B1 | 10/2002 | Guheen et al. |
| 6,505,031 B1 | 1/2003 | Slider et al. |
| 6,514,085 B2 | 2/2003 | Slattery et al. |
| 6,527,556 B1 | 3/2003 | Koskinen |
| 6,532,481 B1 | 3/2003 | Fassett, Jr. |
| 6,532,588 B1 | 3/2003 | Porter |
| 6,546,230 B1 | 4/2003 | Allison |
| 6,587,668 B1 | 7/2003 | Miller et al. |
| 6,606,480 B1 | 8/2003 | L'Allier et al. |
| 6,622,003 B1 | 9/2003 | Denious et al. |
| 6,633,742 B1 | 10/2003 | Turner et al. |
| 6,643,493 B2 | 11/2003 | Kilgore |
| 6,652,283 B1 | 11/2003 | Van Schaack et al. |
| 6,662,003 B2 | 12/2003 | Elder et al. |
| 6,674,992 B2 | 1/2004 | Helmick et al. |
| RE38,432 E | 2/2004 | Fai et al. |
| 6,688,891 B1 | 2/2004 | Sanford |
| 6,690,914 B2 * | 2/2004 | Ramachandran et al. .... 434/350 |
| 6,701,125 B1 | 3/2004 | Lohse |
| 6,709,330 B1 | 3/2004 | Klein et al. |
| 6,711,378 B2 | 3/2004 | Kashima |
| 6,729,885 B2 | 5/2004 | Stuppy et al. |
| 6,766,311 B1 | 7/2004 | Wall et al. |
| 6,801,751 B1 | 10/2004 | Wood et al. |
| 6,802,054 B2 | 10/2004 | Faraj |
| 6,827,578 B2 | 12/2004 | Krebs et al. |
| 6,884,074 B2 | 4/2005 | Theilmann |
| 6,905,883 B1 | 6/2005 | Olmstead |
| 6,978,115 B2 | 12/2005 | Whitehurst et al. |
| 6,988,138 B1 | 1/2006 | Alcorn et al. |
| 7,058,354 B2 | 6/2006 | McCormick et al. |
| 7,096,342 B2 | 8/2006 | Chiu et al. |
| 7,099,889 B2 | 8/2006 | Berks et al. |
| 7,110,989 B2 | 9/2006 | Iemoto et al. |
| 7,162,473 B2 | 1/2007 | Dumais et al. |
| 7,203,670 B2 | 4/2007 | Gormley |
| 7,237,189 B2 | 6/2007 | Altenhofen et al. |
| 7,296,051 B1 | 11/2007 | Kasriel |
| 7,457,817 B2 | 11/2008 | Krishnaswamy et al. |
| 8,005,792 B2 | 8/2011 | Green et al. |
| 2001/0044728 A1 | 11/2001 | Freeman et al. |
| 2001/0047310 A1 | 11/2001 | Russell |
| 2002/0006603 A1 | 1/2002 | Peterson et al. |
| 2002/0042041 A1 | 4/2002 | Owens et al. |
| 2002/0049788 A1 | 4/2002 | Lipkin et al. |
| 2002/0061506 A1 | 5/2002 | Catten et al. |
| 2002/0064766 A1 | 5/2002 | Cozens et al. |
| 2002/0073236 A1 | 6/2002 | Helgeson et al. |
| 2002/0086267 A1 | 7/2002 | Birkhoelzer et al. |
| 2002/0138841 A1 | 9/2002 | Ward |
| 2002/0142278 A1 | 10/2002 | Whitehurst et al. |
| 2002/0168621 A1 | 11/2002 | Cook et al. |
| 2002/0174021 A1 | 11/2002 | Chu et al. |
| 2002/0178038 A1 | 11/2002 | Grybas |
| 2002/0188583 A1 | 12/2002 | Rukavina et al. |
| 2003/0013073 A1 | 1/2003 | Duncan et al. |
| 2003/0028588 A1 | 2/2003 | McConnell et al. |
| 2003/0046265 A1 | 3/2003 | Orton et al. |
| 2003/0049593 A1 | 3/2003 | Parmer et al. |
| 2003/0055699 A1 | 3/2003 | O'Connoer |
| 2003/0073063 A1 | 4/2003 | Dattaray et al. |
| 2003/0073065 A1 | 4/2003 | Riggs |
| 2003/0074320 A1 | 4/2003 | Riggs |
| 2003/0074559 A1 | 4/2003 | Riggs |
| 2003/0082508 A1 | 5/2003 | Barney |
| 2003/0110215 A1 | 6/2003 | Joao |
| 2003/0113700 A1 | 6/2003 | Simon |
| 2003/0129575 A1 | 7/2003 | L'Allier et al. |
| 2003/0129576 A1 | 7/2003 | Wood et al. |
| 2003/0151629 A1 | 8/2003 | Krebs et al. |
| 2003/0152899 A1 | 8/2003 | Krebs et al. |
| 2003/0152900 A1 | 8/2003 | Krebs et al. |
| 2003/0152901 A1 | 8/2003 | Altenhofen et al. |
| 2003/0152902 A1 | 8/2003 | Altenhofen et al. |
| 2003/0152904 A1 | 8/2003 | Doty, Jr. |
| 2003/0152905 A1 | 8/2003 | Altenhofen et al. |
| 2003/0154176 A1 | 8/2003 | Krebs et al. |
| 2003/0157470 A1 | 8/2003 | Altenhofen et al. |
| 2003/0158871 A1 | 8/2003 | Fomenko |
| 2003/0163784 A1 | 8/2003 | Daniel et al. |
| 2003/0175664 A1 | 9/2003 | Frangenheim et al. |
| 2003/0175676 A1 | 9/2003 | Theilmann et al. |
| 2003/0180702 A1 | 9/2003 | Kamikawa et al. |
| 2003/0194690 A1 | 10/2003 | Wessner et al. |
| 2003/0195946 A1 | 10/2003 | Yang |
| 2003/0207245 A1 | 11/2003 | Parker |
| 2003/0211447 A1 | 11/2003 | Diesel et al. |
| 2003/0224339 A1 | 12/2003 | Jain et al. |
| 2003/0232318 A1 | 12/2003 | Altenhofen et al. |
| 2004/0009461 A1 | 1/2004 | Snyder et al. |
| 2004/0010629 A1 | 1/2004 | Diesel et al. |
| 2004/0076941 A1 | 4/2004 | Cunningham et al. |
| 2004/0081951 A1 | 4/2004 | Vigue et al. |
| 2004/0086833 A1 | 5/2004 | Goldberg |
| 2004/0110119 A1 | 6/2004 | Riconda et al. |
| 2004/0133437 A1 | 7/2004 | Draper et al. |
| 2004/0153440 A1 | 8/2004 | Halevy et al. |
| 2004/0202987 A1 | 10/2004 | Scheuring et al. |
| 2004/0210461 A1 | 10/2004 | Bohle |
| 2004/0229199 A1 | 11/2004 | Ashley et al. |
| 2004/0259068 A1 | 12/2004 | Philipp et al. |
| 2005/0014121 A1 | 1/2005 | Eck et al. |
| 2005/0060655 A1 | 3/2005 | Gray et al. |
| 2005/0114408 A1 | 5/2005 | Gold et al. |
| 2005/0131964 A1 | 6/2005 | Saxena |
| 2005/0131970 A1 | 6/2005 | Salazar et al. |
| 2005/0154699 A1 | 7/2005 | Lipkin et al. |
| 2005/0188297 A1 | 8/2005 | Knight et al. |
| 2005/0202391 A1 | 9/2005 | Allen et al. |
| 2005/0202392 A1 | 9/2005 | Allen et al. |
| 2005/0216506 A1 | 9/2005 | Theilmann et al. |
| 2005/0223318 A1 | 10/2005 | Diesel et al. |
| 2005/0227216 A1 | 10/2005 | Gupta |
| 2006/0004886 A1 | 1/2006 | Green et al. |

(56) References Cited

U.S. PATENT DOCUMENTS

| | | | |
|---|---|---|---|
| 2006/0008789 A1 | 1/2006 | Gerteis | |
| 2006/0223044 A1 | 10/2006 | Behbehani | |
| 2007/0100829 A1* | 5/2007 | Allen et al. | 707/9 |
| 2007/0111181 A1 | 5/2007 | Hochwarth et al. | |
| 2007/0224585 A1* | 9/2007 | Gerteis et al. | 434/350 |
| 2008/0015422 A1* | 1/2008 | Wessel | 600/301 |

FOREIGN PATENT DOCUMENTS

| | | |
|---|---|---|
| WO | 98/53384 | 11/1998 |
| WO | 99/09490 | 2/1999 |
| WO | 00/54128 | 9/2000 |
| WO | 02/21379 | 3/2002 |
| WO | 02/073442 | 9/2002 |

OTHER PUBLICATIONS

Advisory Action issued in U.S. Appl. No. 11/258,591 on Jun. 20, 2008; 3 pages.
Office Action issued in U.S. Appl. No. 11/258,591 on Mar. 26, 2008; 8 pages.
Office Action issued in U.S. Appl. No. 11/258,591 on Oct. 5, 2007; 8 pages.
Office Action issued in U.S. Appl. No. 11/258,520 on Nov. 30, 2009; 24 pages.
Advisory Action issued in U.S. Appl. No. 11/258,520 on Sep. 23, 2009; 3 pages.
Office Action issued in U.S. Appl. No. 11/258,520 on Jul. 22, 2009; 21pages.
Office Action issued in U.S. Appl. No. 11/258,520 on Jan. 14, 2009; 14 pages.
Office Action issued in U.S. Appl. No. 11/257,584 on Jan. 11, 2010; 6 pages.
Advisory Action issued in U.S. Appl. No. 11/257,584 on Oct. 19, 2009; 4 pages.
Office Action issued in U.S. Appl. No. 11/257,584 on Jul. 23, 2009; 10 pages.
Office Action issued in U.S. Appl. No. 11/257,584 on Jan. 27, 2009; 8 pages.
Advisory Action issued in U.S. Appl. No. 11/257,584 on Oct. 17, 2008; 3 pages.
Office Action issued in U.S. Appl. No. 11/257,584 on Jul. 23, 2008; 9 pages.
Office Action issued in U.S. Appl. No. 11/257,584 on Feb. 25, 2008; 8 pages.
Office Action issued in U.S. Appl. No. 11/257,587 on Mar. 4, 2010; 11 pages.
Office Action issued in U.S. Appl. No. 11/257,587 on Aug. 20, 2009; 9 pages.
Office Action issued in U.S. Appl. No. 11/257,587 on May 1, 2009; 8 pages.
Office Action issued in U.S. Appl. No. 11/257,587 on Dec. 1, 2008; 9 pages.
Advisory Action issued in U.S. Appl. No. 11/301,595 on Mar. 29, 2010; 3 pages.
Office Action issued in U.S. Appl. No. 11/301,595 on Jan. 25, 2010; 21 pages.
Office Action issued in U.S. Appl. No. 11/301,595 on Jun. 25, 2009; 13 pages.
Office Action issued in U.S. Appl. No. 11/258,457 on Mar. 17, 2010; 7 pages.
Office Action issued in U.S. Appl. No. 11/258,457 on Dec. 24, 2008; 7 pages.
Office Action issued in U.S. Appl. No. 11/258,527 on Apr. 5, 2010; 19 pages.
Office Action issued in U.S. Appl. No. 11/258,527 on Oct. 2, 2009; 20 pages.
Advisory Action issued in U.S. Appl. No. 11/258,527 on Jul. 2, 2009; 3 pages.
Office Action issued in U.S. Appl. No. 11/258,527 on May 1, 2009; 14 pages.
Office Action issued in U.S. Appl. No. 11/258,527 on Dec. 29, 2008; 14 pages.
Office Action issued in U.S. Appl. No. 11/257,585 on Dec. 18, 2009; 10 pages.
Advisory Action issued in U.S. Appl. No. 11/257,585 on Sep. 23, 2009; 3 pages.
Office Action issued in U.S. Appl. No. 11/257,585 on Aug. 3, 2009; 12 pages
Office Action issued in U.S. Appl. No. 11/257,585 on Jan. 28, 2009; 10 pages.
Advisory Action issued in U.S. Appl. No. 11/257,585 on Oct. 31, 2008; 3 pages.
Office Action issued in U.S. Appl. No. 11/257,585 on Sep. 5, 2008; 11 pages.
Office Action issued in U.S. Appl. No. 11/257,585 on Mar. 24, 2008; 8 pages.
Office Action issued in U.S. Appl. No. 11/257,589 on Jan. 7, 2010; 8 pages.
Advisory Action issued in U.S. Appl. No. 11/257,589 on Sep. 17, 2009; 3 pages.
Office Action issued in U.S. Appl. No. 11/257,589 on Jun. 26, 2009; 10 pages.
Advisory Action issued in U.S. Appl. No. 11/257,589 on Jun. 3, 2009; 3 pages.
Office Action issued in U.S. Appl. No. 11/257,589 on Apr. 3, 2009; 7 pages.
Office Action issued in U.S. Appl. No. 11/257,589 on Nov. 14, 2008; 9 pages.
Advisory Action issued in U.S. Appl. No. 11/374,497 on Apr. 8, 2009; 3 pages.
Office Action issued in U.S. Appl. No. 11/374,497 on Jan. 28, 2009; 13 pages.
Office Action issued in U.S. Appl. No. 11/374,497 on Sep. 3, 2008; 13 pages.
Chappell, David; "Asynchronous Web Services and the Enterprise Service Bus"; May 6, 2002; 5 pages; <http://www.webservice.org>; site visited Dec. 4, 2006.
Siekmann, Joerg et al.; "Adaptive Course Generation and Presentation"; ITS Workshop on Adaptive and Intelligent Web-Based Foundation System; Montreal; The Omega Group; pp. 1-10; 2000.
Jin, Lai et al.; "An Ontology-Aware Authoring Tool—Functional Structure and Guidance Generation"; Proceedings of AIED '99; pp. 85-92; Le Manns, France; 1999.
Dietrich, Albert et al.; "Adaptive and Dynamic Hypertext Tutoring Systems Based on Knowledge Space Theory"; AIED '97 Artificial Intelligence in Education; Amsterdam; vol. 39 of Froulier in Artificial Intelligence and Application; 3 pages; 1997.
Ranwez, Sylvie et al.; "Description and Construction of Pedagogical Material Using an Ontology Based DTD"; AIED '99 Workshop 2 Proceedings; Ontologies for Intelligen Educational Systems; pp. 1-4; 1999.
Jungmann, Michael et al.; "Adaptive Hypertext in Complex Information Spaces"; Daimler-Benz Research & Technology; Technial University of Ilmenau; pp. 1-15; Mar. 8, 1997.
Henze, Nicola et al.; "Modeling Constructivist Teacgubg Functionality and Structure in the KBS Hyperbook System"; University of Hannover; pp. 1-12; Jun. 4, 1999.
Muehlhaeuser, Max; "Cooperative Computer-Aided Authoring and Learning"; University of Karlsruhe; pp. 107-130, 145-161,165-192, 273-291, 293-318; 1995.
Passo, Professor Jouko; "A New Environment for Courseware Development, Course Delivery, and Training"; Proceedings of the ED-Media 97; Toronto; 1997; 10 pages.
Sun Microsystems; "Developing Web Services with SUN Open Network Environment"; Mar. 2002; <http://wwws.sun.com/software/sunone/wp-spine/spine.pdf>; retrieved from the Internet on Mar. 24, 2004; pp. 1-32.
Trythall, Steve; "JMS and CORBA Notification Interworking"; Dec. 12, 2001; <http://www.onjava.com/pub/a/onjava/2001/12/12/jms_not.html>; retrieved from the Internet on Mar. 24, 2004; 8 pages.

(56) References Cited

OTHER PUBLICATIONS

Lipkin, Daniel; "Universal Learning Format Technical Specification"; Jan. 13, 2001; <http://xml.coverpages.org/ulf.html>; retrieved from the Internet on Jul. 29, 2004; pp. 1-3.

x.hlp; "Software for Faster Learning"; <http://www.xhlp.com/home.cfm>; Apr. 2003; 7 pages.

Global Knowledge Network, Inc.; "On Demand Personal Navigator" <http://kp.globalknowledge.com/products/od/index.asp>; Sep. 2002; 2 pages.

Hewlett Packard; "HP OpenView Integration Guide for Developers"; Jul. 2002 <http://h21007.www2.hp.com/dspp/files/unprotected/OpenView/IntegrationGuide/OV_Integration_Guide_7_30.pdf>; retrieved from the Internet on Mar. 24, 2004; pp. 67-92.

Hewlett Packard; "HP Open View Service Navigator for HP Open View Operations 7.x for UNiX Product Brief"; May 2002; <http://www.pervigil.com/PDF/HP/sernav_pb_jun02.pdf>; retrieved from the Internet on Mar. 24, 2004; 2 pages.

Eugster, Patrick et al.; "Distributed Asynchronous Collections: Abstractions for Publish/Subscribe Interaction"; XP-002171795; Agilent Laboratories; Edinburgh; Jan. 10, 2000; pp. 1-34.

Shiroshita, Teruji et al.; "A Large-Scale Contents Distribution Architecture Based on Reliable Multicast"; XP-10365597; Proceedings Internet Workshop; 1999; IWS '99; Osaka, Japan; Feb. 18-20, 1999; pp. 75-80.

Cisco Systems; "Cisco System—Reusable Information Object Strategy Definition, Creation Overview, and Guidelines"; Version 3.0; Jun. 25, 1999.

Notice of Allowance issued in U.S. Appl. No. 11/257,584 on Jul. 12, 2010; 6 pages.

Office Action issued in U.S. Appl. No. 11/257,587 on Aug. 11, 2011; 12 pages.

Office Action issued in U.S. Appl. No. 11/258,520 on Apr. 29, 2010; 22 pages.

Advisory Action issued in U.S. Appl. No. 11/258,520 on Jun. 25, 2010; 3 pages.

Office Action issued in U.S. Appl. No. 11/258,520 on Oct. 1, 2010; 25 pages.

Office Action issued in U.S. Appl. No. 11/258,520 on Mar. 31, 2011; 28 pages.

Office Action issued in U.S. Appl. No. 11/258,457 on Sep. 21, 2010; 7 pages.

Office Action issued in U.S. Appl. No. 11/258,457 on Mar. 29, 2011; 9 pages.

Office Action issued in U.S. Appl. No. 11/258,527 on Oct. 15, 2010; 22 pages.

Office Action issued in U.S. Appl. No. 11/257,585 on Jun. 25, 2010; 11 pages.

Office Action issued in U.S. Appl. No. 11/257,589 on Jul. 12, 2010; 9 pages.

Office Action issued in U.S. Appl. No. 11/257,589 on Oct. 28, 2010; 9 pages.

Office Action issued in U.S. Appl. No. 11/257,589 on Apr. 28, 2011; 9 pages.

Office Action issued in U.S. Appl. No. 11/257,589 on Jun. 24, 2011; 9 pages.

Office Action issued in U.S. Appl. No. 11/257,587 on Dec. 6, 2011; 12 pages.

Office Action issued in U.S. Appl. No. 11/258,457 on Dec. 13, 2011; 8 pages.

Notice of Allowance issued in U.S. Appl. No. 11/258,527 on Nov. 16, 2011; 10 pages.

Office Action issued in U.S. Appl. No. 11/257,589 on Sep. 15, 2011; 9 pages.

Advisory Action issued in U.S. Appl. No. 11/257,589 on Oct. 28, 2011; 3 pages.

Office Action issued in U.S. Appl. No. 11/257,589 on Dec. 22, 2011; 10 pages.

* cited by examiner

METHOD AND SYSTEM FOR MANAGING LEARNING MATERIALS PRESENTED OFFLINE

TECHNICAL FIELD

The present disclosure relates generally to learning systems and, more particularly, to a method and system for managing learning materials presented offline.

BACKGROUND

Today, an enterprise's survival in local or global markets at least partially depends on the knowledge and competencies of its employees, which may easily be considered a competitive factor for the enterprises (or other organizations). Shorter product life cycles and the speed with which the enterprise can react to changing market requirements are often important factors in competition and ones that underline the importance of being able to convey information on products and services to employees as swiftly as possible. Moreover, enterprise globalization and the resulting international competitive pressure are making rapid global knowledge transfer even more significant. Thus, enterprises are often faced with the challenge of lifelong learning to train a (perhaps globally) distributed workforce, update partners and suppliers about new products and developments, educate apprentices or new hires, or set up new markets. In other words, efficient and targeted learning is a challenge that learners, employees, and employers are equally faced with. But traditional classroom training typically ties up time and resources, takes employees away from their day-to-day tasks, and drives up expenses. Electronic learning systems provide users with the ability to access course content directly from their computers, without the need for intermediaries such as teachers, tutors, and the like.

SUMMARY

This disclosure generally describes managing learning materials (e.g., a training course) presented offline. A learner may not have continuous internet access or may prefer to watch training courses on a device not continuously connected to the internet, such as a television or other media player. Thus, the training course may be generated for presentation offline and identifications strings may be associated with the training course. The identification strings may be utilized to keep track of the learner's progress. As a learner progresses through a training course (e.g., view, pass tests, etc.), identification strings may be presented to the learner and the learner may provide (e.g., via a telephone, via a smart phone, via email, via a connected computer) the identification strings to the various systems.

In certain specific aspects of the software, the software may generate electronic learning materials for offline presentation and one or more identification strings. At least a portion of the electronic learning materials may be associated with at least one of the generated identification strings. A second identification string related to the offline presentation of the generated electronic learning materials may be received and a progress of a learner, with respect to the generated electronic learning materials, may be identified at least partially based on the received second identification string and the associated identification strings.

In some, more specific, aspects, learning materials for delivery to learners for presentation offline, and a mapping identifying one or more identification strings associated with one or more portions of the learning materials may be stored in a repository. The mapping may allow identification of a progress of a learner with respect to one of the electronic learning materials.

While generally described as software, some or all of the aspects may be further included in respective systems or other devices for executing or implementing dynamic content publishing. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally describes software, methods, and systems for managing offline presentation of leaning materials (e.g., training courses). Learning materials may deliver a learning solution of learning methods used in traditional classroom training, web-based training, and/or virtual classrooms. The learning materials may be available electronically through the system. For example, a learner may access a learning management system through the Internet and, for example, download the learning materials for later offline presentation (e.g., presentation on DVD player, computer, smart phone, Playstation or other video console, media players such as televisions or iPods, etc.). To manage the progress of learners through the learning materials, identification strings may be utilized. The identification strings may be presented to the learner during the offline presentation and the learner may provide the identification string to the system (e.g., the learner transmit the identification string using a telephone, cellular phone, computer with Internet access, etc.)

Figure 1:
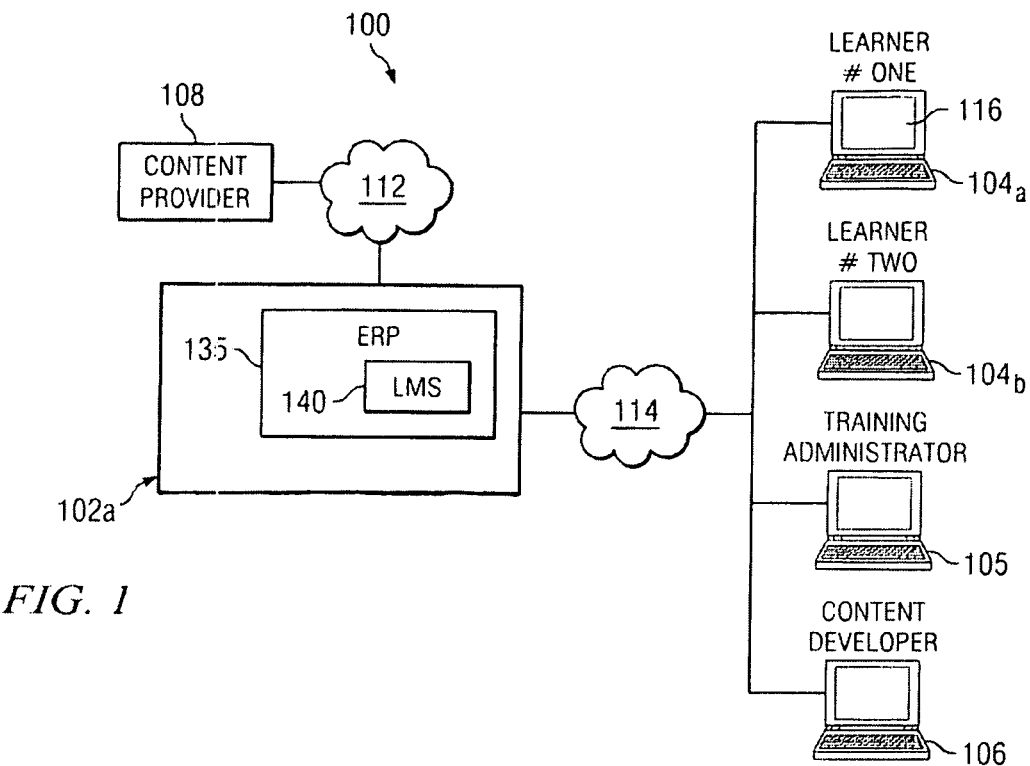
FIG. 1 illustrates an example learning environment in accordance with certain embodiments included in the present disclosure.

Turning to the example implementation of FIG. 1, the illustrated software environment 100 for a learning management system 140 may deliver a blended learning solution of learning methods used in traditional classroom training, web-based training, and virtual classrooms. At a high level, the learning management system 140 provides convenient information on the learner 104's virtual workplace and may at least partially control the learning process. The system 140 may propose learning units to a learner 104 based on the learner's personal data, track progress through courses and/or coordinate the personalized learning experience. In addition, learning management system 140 may encompass the administrative side of the learning platform, where a training administrator 105 structures and updates the offering and distributes it among the target groups. Moreover, the course offering may or may not be restricted to internally hosted content. The learning management system 140 may offer robust reporting capabilities, including ad hoc reporting and business intelligence. These capabilities may provide in-depth analysis of the entire business or organization, thereby enabling better decision-making. Moreover, while implementing certain versioning techniques, learning management system 140 may significantly improve the time and storage required for creating versions of particular learning objects, while maintaining the basic structure of the original format, helping to ensure compatibility with other systems. More specifically, support for accessing delta versioned files may be transparent to the learner 104 via the existing client, such that applications reading the content can remain unchanged. Also, the lookup for a referenced file is fast and, therefore, the read performance is not affected in any significant way.

Learning management system 140 may also help improve the quality of training and cut costs by reducing the travel and administrative costs associated with classroom training, while delivering a consistent learning offering. Training administrators 105 may customize teaching scenarios by using web services to integrate external content, functions, and services into the learning platform from a remote or third party content provider 108. The training administrator 105 can administer internal and external participants (or learners 104) and enroll them for courses to be delivered via any suitable technique. Training management supports the respective organization, entity, or learner 104 in the day-to-day activities associated with course bookings. Booking activities can be performed by the training administrator 105 in training management on an individual or group participant basis. For example, training administrator 105 can request, execute, or otherwise manage one or more of the following activities in a dynamic participation menu presented in learning management system 140: i) prebook: if participants are interested in taking certain classroom courses or virtual classroom sessions, but there are no suitable dates scheduled, learners 104 can be prebooked for the course types. Prebooking data can be used to support a demand planning process; ii) book: individual or group learners 104 (for example, companies, departments, roles, or other organizational units) can be enrolled for courses that can be delivered using many technologies; iii) rebook: learners 104 can book a course on an earlier or later date than originally booked; iv) replace: learners 104 can be swapped; and v) cancel: course bookings can be canceled, for example, if the learners 104 cannot attend.

Environment 100 is typically a distributed client/server system that spans one or more networks such as external network 112 or internal network 114. In such embodiments, data may be communicated or stored in an encrypted format such as, for example, using the RSA, WEP, or DES encryption algorithms. In other implementations, environment 100 may be in a dedicated enterprise environment—across a local area network or subnet—or any other suitable environment without departing from the scope of this disclosure. Indeed, while generally described or referenced in terms of an enterprise, the components and techniques may be implemented in any suitable environment, organization, entity, and such.

Referring to FIG. 1, environment 100 may include or be communicably coupled with server 102, one or more learners 104 or other users on clients, and network 112. In this embodiment, environment 100 is also communicably coupled with external content provider 108. Server 102 comprises an electronic computing device operable to receive, transmit, process, store, or manage data and information associated with the software environment 100.

Generally, FIG. 1 provides merely one example of computers that may be used with the disclosure. As used in this document, the term "computer" is intended to encompass any suitable processing device. For example, although FIG. 1 illustrates one server 102 that may be used with the disclosure, environment 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Server 102 may be adapted to execute any operating system including Linux, UNIX, Windows, Mac OS X, or any other suitable operating system. According to one embodiment, server 102 may also include or be communicably coupled with a web server and/or a mail server. Server 102 may also be communicably coupled with a remote repository over a portion of network 112. While not illustrated, the repository may be any intra-enterprise, inter-enterprise, regional, nationwide, or other electronic storage facility, data processing center, or archive that allows for one or a plurality of clients (as well as servers 102) to dynamically store data elements, which may include any business, enterprise, application or other transaction data. For example, the repository may be a central database communicably coupled with one or more servers 102 and clients via a virtual private network (VPN), SSH (Secure Shell) tunnel, or other secure network connection. This repository may be physically or logically located at any appropriate location including in one of the example enterprises or off-shore, so long as it remains operable to store information associated with environment 100 and communicate such data to at least a subset of a plurality of the clients (perhaps via server 102).

As a possible supplement to, replacement for, or as a portion of this repository, server 102 may include local memory. The memory may include any tangible media, such as any memory or database module and may take the form of volatile or non-volatile memory including, without limitation, magnetic media, optical media, random access memory (RAM), read-only memory (ROM), flash media, removable media, or any other suitable local or remote memory component. For example, the memory may store or reference a large volume of information relevant to the planning, management, and/or follow-up of courses or other content. This example data may include information on i) course details, such as catalog information, dates, prices, capacity, time schedules, assignment of course content, and completion times; ii) personnel resources, such as trainers who are qualified to hold courses; iii) room details, such as addresses, capacity, and equipment; and iv) participant data for internal and external participants. The memory may also include any other appropriate data such as VPN applications or services, firmware logs and policies, firewall policies, a security or access log, print or other reporting files, HTML files or templates, data classes or object interfaces, child software applications or sub-systems, and others. Memory may also store various objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the server. In some embodiments, the memory may store information as one or more tables in a relational database described in terms of SQL statements or scripts. In another embodiment, the memory may store information as various data structures in text files, eXtensible Markup Language (XML) documents, Virtual Storage Access Method (VSAM) files, flat files, Btrieve files, comma-separated-value (CSV) files, internal variables, or one or more libraries. But any stored information may comprise one table or file or a plurality of tables or files stored on one computer or across a plurality of computers in any appropriate format. Indeed, some or all of the learning or content data may be local or remote without departing from the scope of this disclosure and store any type of appropriate data.

Server 102 also includes one or more processors. Each processor executes instructions and manipulates data to perform the operations of server 102, and may comprise, for example, a central processing unit (CPU), a blade, an application specific integrated circuit (ASIC), or a field-programmable gate array (FPGA), among other suitable options. Although this disclosure typically discusses computers in terms of a single processor, multiple processors may be used according to particular needs and reference to one processor is meant to include multiple processors where applicable. In the illustrated embodiment, the processor executes enterprise resource planning (ERP) solution 135, which may provide organizations with strategic insight, ability to differentiate, increased productivity, and flexibility needed to succeed. With software such as ERP solution 135, the implementing entity may automate end-to-end processes and extend those processes beyond the particular organization to the entire system by incorporating customers, partners, suppliers, or other entities. For example, ERP solution 135 may include or implement easy-to-use self-services and role-based access to information and services for certain users, thereby possibly boosting productivity and efficiency. In another example, ERP solution 135 may include or implement analytics that enable the particular entity or user to evaluate performance and analyze operations, workforce, and financials on an entity and individual level for strategic and operational insight. ERP solution 135 may further include or implement i) financials to control corporate finance functions while providing support for compliance to rigorous regulatory mandates; ii) operations to support end-to-end logistics for complete business cycles and capabilities that improve product quality, costs, and time to market; and/or iii) corporate services to optimize both centralized and decentralized services for managing real estate, project portfolios, business travel, environment, health and safety, and quality. In the illustrated embodiment, ERP solution 135 also includes or implements some form of human capital management (in this case, learning) to maximize or increase the profitability or other measurable potential of the users, with support for talent management, workforce deployment, and workforce process management. In certain cases, ERP solution 135 may be a composite application that includes, executes, or otherwise implements some or all of the foregoing aspects, which include learning management system 140 as illustrated.

As briefly described above, learning management system 140 is any software operable to provide a comprehensive or other suitable enterprise learning platform capable of managing and integrating business and learning processes and supporting, in one embodiment, all methods of learning, not restricted to e-learning or classroom training. As described in more detail in FIG. 2, learning management system 140 may be fully integrated with ERP solution 135 and include an intuitive learning portal and a powerful training and learning management system, as well as content authoring, structuring, and management capabilities. Learning management system 140 may offer back-office functionality for competency management and comprehensive assessment for performance management, and may offer strong analytical capabilities, including support for ad hoc reporting. The solution may use a comprehensive learning approach to deliver knowledge to all stakeholders, and tailor learning paths to an individual's educational needs and personal learning style. Interactive learning units can be created with a training simulation tool that is also available.

Regardless of the particular implementation, "software" may include software, firmware, wired or programmed hardware, or any combination thereof as appropriate. Indeed, each software component may be fully or partially written or described in any appropriate computer language including C, C++, Java, Visual Basic, assembler, Perl, ABAP, any suitable version of 4GL, a proprietary computer language, or any other suitable language. Indeed, ERP solution 135 may be written or described in any appropriate computer language including C, C++, Java, J#, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while ERP solution 135 is illustrated in FIG. 1 as including one sub-module learning management system 140, ERP solution 135 may include numerous other sub-modules or may instead be a single multi-tasked module that implements the various features and functionality through various objects, methods, or other processes. Further, while illustrated as internal to server 102, one or more processes associated with ERP solution 135 may be stored, referenced, or executed remotely. For example, a portion of ERP solution 135 may be a web service that is remotely called, while another portion of ERP solution 135 may be an interface object bundled for processing at the remote client. Moreover, ERP solution 135 and/or learning management system 140 may be a child or sub-module of another software module or enterprise application (not illustrated) without departing from the scope of this disclosure.

Server 102 may also include an interface for communicating with other computer systems, such as the clients, over networks, such as 112 or 114, in a client-server or other distributed environment. In certain embodiments, server 102 receives data from internal or external senders through the interface for storage in the memory and/or processing by the processor. Generally, the interface comprises logic encoded in software and/or hardware in a suitable combination and operable to communicate with networks 112 or 114. More specifically, the interface may comprise software supporting one or more communications protocols associated with communications network 112 or hardware operable to communicate physical signals.

Network 112 facilitates wireless or wireline communication between computer server 102 and any other local or remote computers, such as clients. Network 112, as well as network 114, facilitates wireless or wireline communication between computer server 102 and any other local or remote computer, such as local or remote clients or a remote content provider 108. While the following is a description of network 112, the description may also apply to network 114, where appropriate. For example, while illustrated as separate networks, network 112 and network 114 may be a continuous network logically divided into various sub-nets or virtual networks without departing from the scope of this disclosure.

In some embodiments, network 112 includes access points that are responsible for brokering exchange of information between the clients. As discussed above, access points may comprise conventional access points, wireless security gateways, bridges, wireless switches, sensors, or any other suitable device operable to receive and/or transmit wireless signals. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. Turning to network 114, as illustrated, it may be all or a portion of an enterprise or secured network. In another example, network 114 may be a VPN between server 102 and a particular client across wireline or wireless links. In certain embodiments, network 114 may be a secure network associated with the enterprise and certain local or remote clients.

Each client is any computing device operable to connect or communicate with server 102 or other portions of the network 114 using any communication link. At a high level, each client includes or executes at least GUI 116 and comprises an electronic computing device operable to receive, transmit, process and store any appropriate data associated with environment 100. It will be understood that there may be any number of clients communicably coupled to server 102. Further, "client" and "learner," "administrator," "developer" and "user" may be used interchangeably as appropriate without departing from the scope of this disclosure. Moreover, for ease of illustration, each client is described in terms of being used by one user. But this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device or computer. For example, the client may be a PDA operable to wirelessly connect with external or unsecured network. In another example, the client may comprise a laptop that includes an input device, such as a keypad, touch screen, mouse, or other device that can accept information, and an output device that conveys information associated with the operation of server 102 or other clients, including digital data, visual information, or GUI 116. Both the input device and output device may include fixed or removable storage media such as a magnetic computer disk, CD-ROM, or other suitable media to both receive input from and provide output to users of the clients through the display, namely, the client portion of GUI or application interface 116.

GUI 116 comprises a graphical user interface operable to allow the user of the client to interface with at least a portion of environment 100 for any suitable purpose, such as viewing application or other transaction data. Generally, GUI 116 provides the particular user with an efficient and user-friendly presentation of data provided by or communicated within environment 100. As shown in later FIGs., GUI 116 may comprise a plurality of customizable frames or views having interactive fields, pull-down lists, and buttons operated by the user. GUI 116 may be a learning interface allowing the user or learner 104 to search a course catalog, book and cancel course participation, and support individual course planning (e.g., by determining qualification deficits and displaying a learner's completed, started, and planned training activities). Learner 104 also may access and work through web based courses using the learning interface. The learning interface may be used to start a course, reenter a course, exit a course, and take tests. The learning interface may also provide messages, notes, and special course offerings to the learner 104. GUI 116 may also be a course editor allowing the content developer to create the structure for the course content, which may be associated with certain metadata. The metadata may be interpreted by a content player of learning management system 140 (described below) to present a course to learner 104 according to a learning strategy selected at run time. In particular, the course editor may enable the author or content developer 106 to classify and describe structural elements, assign attributes to structural elements, assign relations between structural elements, and build a subject-taxonomic course structure. The course editor generates the structure of the course and may include a menu bar, a button bar, a course overview, a dialog box, and work space. The menu bar may include various drop-down menus, such as, for example, file, edit, tools, options, and help. The drop-down menus may include functions, such as create a new course, open an existing course, edit a course, or save a course. The button bar may include a number of buttons. The buttons may be shortcuts to functions in the drop-down menus that are used frequently and that activate tools and functions for use with the course editor. The remaining portions of the example course editor interface may be divided in to three primary sections or windows: a course overview, a dialog box, and a workspace. Each of the sections may be provided with horizontal or vertical scroll bars or other means allowing the windows to be sized to fit on different displays while providing access to elements that may not appear in the window.

GUI 116 may also present a plurality of portals or dashboards. For example, GUI 116 may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. Real-time dashboards often provide table and graph information on the current state of the data, which may be supplemented by presentation elements. GUI 116 is often configurable, supporting a combination of tables and graphs (bar, line, pie, status dials, etc.), and is able to build real-time dashboards, where presentation elements (as well the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI 116 may indicate a reference to the front-end or other component of learning management system 140, as well as the particular interface or learning portal accessible via the client, as appropriate, without departing from the scope of this disclosure. In short, GUI 116 contemplates any graphical user interface, such as a generic web browser or touch screen, which processes information in environment 100 and efficiently presents the results to the user. Server 102 can accept data from the client via the web browser (e.g., Microsoft Internet Explorer or Netscape Navigator) and return the appropriate HTML or XML responses to the browser using network 112 or 114, such as those illustrated in subsequent figures.

Although the above illustration includes a learner accessing learning materials through a processing device, such as a computer, in some implementations a learner may accessing learning materials through media, such as DVDs, CDs, etc. As another example, learner may receive the learning materials through a processing device communicably coupled to server 102 and then be presented the learning materials offline (e.g., through the same processing device when not coupled to the server, through a smart phone, through a media player such as a television or an iPod). Allowing management of offline learning may provide learners with greater flexibility since a connection to the server 102 may not be necessary. For example, learners may be presented learning materials on their smart phones while flying and unconnected to data networks (e.g., 3G), on their televisions (e.g., through DVDs or other memory devices on which the learning materials may be downloaded or stored).

Figure 2:
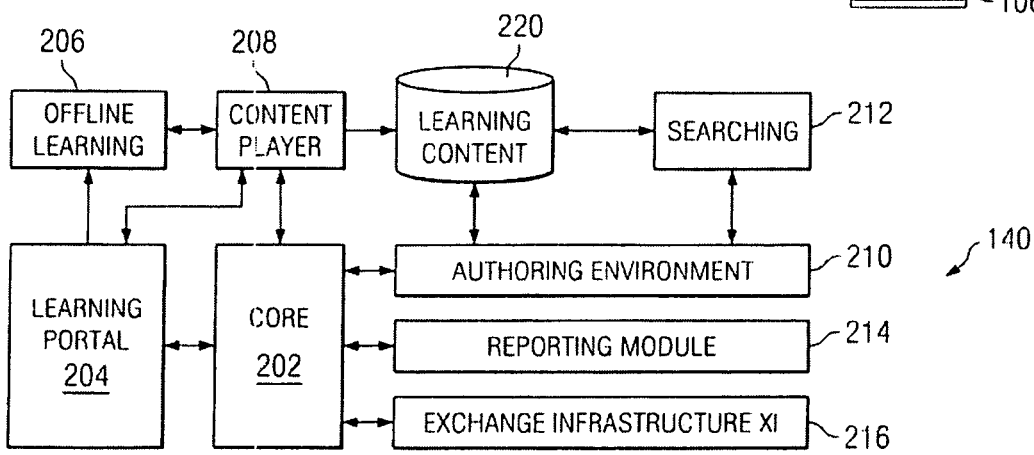
FIG. 2 illustrates an example learning management system in accordance with certain embodiments of the learning environment of FIG. 1.

FIG. 2 illustrates one example implementation of learning management system (LMS) 140. In the illustrated embodiment, LMS 140 comprises four example components, namely i) a management system core 202, which controls learning processes and manages and handles the administrative side of training; ii) a learning portal 204, which is the learner's springboard into the learning environment, which allows the learner to access the course offering and information on personal learning data and learning activities; iii) an authoring environment 210, where learning content and tests are designed and structured; and iv) a content management system 220, where learning content is stored and managed. The LMS 140 may comprise only some of the described components and/or additional components. For example, the learning management system may include various modules, such as an identification module and/or a management module, to facilitate management of the offline presentations. These modules of the learning management system may be execute by a processor of the server 102 to perform various operations. For example, the identification module of the learning management system may identify a progress of a learner with respect to learning materials presented offline based on identification strings received from a learner and mappings of the associations between identification strings and learning materials. A management module may generate identification strings, select at least one identification string from the library, associate the selected identification strings with at least a portion of an electronic learning material, determine identification strings associated with specified learning materials, access various memories to determine information such as associations between learning materials and identification strings, monitor the progress of learners with respect to learning materials, transmit information such as learning materials and identification strings to users, and/or any other appropriate management of offline presentation operations. The management module may also monitor the progress of a learner and allow generation of various reports based on the progress, learner, etc. Generally, LMS 140 is aimed at learners 104, trainers 105, course authors 106 and instructional designers, administrators, and managers.

Learners 104 log on to their personalized learning portal 204 from any suitable client via GUI 116. The learning portal 204 is the user's personalized point of access to the learning-related functions. Generally, learning portal 204 presents details of the complete education and training offering, such as traditional classroom training, e-learning courses (such as virtual classroom sessions or web-based training), or extensive curricula. Self-service applications enable learners 104 to enroll themselves for courses, prebook for classroom courses, and cancel bookings for delivery methods, as well as start self-paced learning units directly. If learner 104 wants to continue learning offline, the learner can download the courses onto the client, or onto a memory device (e.g., USB flash memory device, DVD, AppleTV®, etc.) and synchronize the learning progress later (e.g., through identification strings associated with the downloaded content)). The learning portal 204 may be seamlessly integrated in an enterprise portal, where learner 104 is provided with access to a wide range of functions via one system. Such an enterprise portal may be the learner's single point of entry and may integrate a large number of role-based functions, which are presented to the user in a clear, intuitive structure. The learning portal 204 may give learner 104 access to functions such as, for example, search for courses using i) find functions: finding courses in the course catalog that have keywords in the course title or description; and ii) extended search functions: using the attributes appended to courses, such as target group, prerequisites, qualifications imparted, or delivery method. Additional functions may include self-service applications for booking courses and canceling bookings, messages and notes, course appraisals, and special (or personalized) course offering including courses prescribed for the learner 104 on the basis of his or her role in the enterprise or the wishes of the respective supervisor or trainer and qualification deficits of learner 104 that can be reduced or eliminated by participating in the relevant courses. The learning portal 204 may also provide a view of current and planned training activities, as well as access to courses booked, including: i) starting a course; ii) reentering an interrupted course; iii) downloading a course and continuing learning offline; iv) going online again with a downloaded course and synchronizing the learning progress; v) exiting a course; and vi) taking a test.

On the basis of the information the learning management system 140 has about learner 104, the learning management system core 202 may propose learning units for the learner 104, monitor the learner's progress, and coordinate the learner's personal learning process. In addition, the learning management system core 202 may be responsible for managing and handling the administrative processes. Targeted knowledge transfer may use precise matching of the learning objectives and qualifications of a learning unit with the learner's level of knowledge. For example, at the start of a course, the management system core 202 may compare learning objectives already attained by the respective learner 104 with the learning objectives of the course. On the basis of this, core 202 may determine the learner's current level and the required content and scope of the course. The resulting course is then presented to the learner 104 via a content player 208.

The content player 208 is a virtual teacher that tailors learning content to the needs of the individual learner 104 and helps the learner navigate through the course. In this embodiment, the content player 208 may present the learning course to the learner 104. In certain embodiments, the content player 208 is a Java application that is deployed on a Java runtime environment, such as J2EE. In this case, it is linked with other systems such as a web application server and ERP solution 135 via the Java Connector. The individual course navigation may be set up at runtime on the basis of the learning strategy stored in the learner account. In particular, the content player 208 may, when starting a learning course, read from the ERP 135 or other backend system which strategies are allowed for the course and/or selected for the course. Selected and/or changed strategies for a course are stored in the backend system. Using the didactical strategies, content player 208 may dynamically adapt the course to the individual learning situation and the preferences expressed by learner 104. The content player 208 may calculate dynamically adjusted learning paths and present these to the learner 104—graphically or otherwise—to facilitate orientation within a complex subject area. The learner 104 can resume working on an interrupted course at any time. At this point, the content player 208 guides the learner 104 to the spot at which training was interrupted.

Offline learning player 206 generally enables learners 104 to download network or other web-based courses from the learning portal 204 and play them locally. Locally stored courses are listed in the course list with an icon indicating the status of each course. The offline player 206 may guide the learner 104 through the course according to the preferred learning strategy. It may also dynamically adjust the number and sequence of learning objects to the learner's individual learning pattern. If the learner 104 interrupts a course, the offline player 206 reenters the course at the point of interruption the next time. The learner 104 can, at any point in time, resynchronize his offline learning progress with the learning portal 204 and either continue learning online or set the course to a completed status.

LMS core 202 may also include or invoke training management that would be an administrative side of LMS 140. This may include course planning and execution, booking and cancellation of course participation, and follow-up processing, including cost settlement. In training management, the training administrator 105 creates the course offering and can, for example, define training measures for individual learners 104 and groups of learners 104. The training administrator 105 creates the course catalog in training management and makes it available (partially or completely) to learners 104 in the learning portal 204 for reference and enrollment purposes. The training administrator 105 can typically administer internal and external participants and enroll them for courses to be delivered using various technologies and techniques. Training management supports numerous business processes involved in the organization, management, and handling of training. Training management can be configured to meet the requirements, work processes, and delivery methods common in the enterprise. Training measures are usually flexibly structured and may include briefings, seminars, workshops, virtual classroom sessions, web-based trainings, external web-based trainings, static web courses, or curricula. Training management includes functions to efficiently create the course offerings. Using course groups to categorize topics by subject area enables flexible structuring of the course catalog. For example, when training administrator 105 creates a new subject area represented by a course group, he can decide whether it should be accessible to learners 104 in the learning portal 202.

Reporting functions 214 in training management enable managers to keep track of learners' learning activities and the associated costs at all times. Supervisors or managers can monitor and steer the learning processes of their employees. They can be notified when their employees request participation or cancellation in courses and can approve or reject these requests. LMS 140 may provide the training manager with extensive support for the planning, organization, and controlling of corporate education and training. Trainers need to have up-to-the-minute, reliable information about their course schedules. There is a wide range of reporting options available in training management to enable the trainer to keep track of participants, rooms, course locations, and so on.

Authoring environment 210 may contain tools and wizards that content developers 106 and instructional designers can use to create or import external course content. External authoring tools can be launched directly via authoring environment 210 to create learning content that can be integrated into learning objects and combined to create complete courses (learning nets). Attributes may be appended to content, thereby allowing learners 104 to structure learning content more flexibly depending on the learning strategy they prefer. Customizable and flexible views allow subject matter experts and instructional designers to configure and personalize the authoring environment 210. To create the HTML pages for the content, the user can, in one embodiment, easily and seamlessly integrate editors from external providers or other content providers 108 into LMS 140 and launch the editors directly from authoring environment 210. Authoring environment 210 may include a number of tools for creating, structuring, and publishing course content and tests to facilitate and optimize the work of instructional designers, subject matter experts, and training administrators 105. Authoring environment 210 may contain any number of components or sub-modules such as an instructional design editor is used by instructional designers and subject matter experts to create and structure learning content (learning nets and learning objects), a test author is used by instructional designers and subject matter experts to create web-based tests, and a repository explorer is used by training administrators and instructional designers to manage content.

In the illustrated embodiment, course content is stored and managed in learning content management system 220. Put another way, LMS 140 typically uses the learning content management system 220 as its content storage location. In another embodiment, a WebDAV (Web-based Distributed Authoring and Versioning) interface (or other HTTP extension) may allow integration of other WebDAV-enabled storage facilities as well without departing from the scope of this disclosure. Content authors or developers 106 publish content in the back-end training management system. Links to this content may assist the training administrator 105 in retrieving suitable course content when planning web-based courses. A training management component of LMS 140 may help the training administrator 105 plan and create the course offering; manage participation, resources, and courses; and perform reporting. When planning e-learning courses, the training administrator 105 may use references inserted in published courses to retrieve the appropriate content in the content management system for the courses being planned. Content management system 220 may also include or implement content conversion, import, and export functions, allowing easy integration of Sharable Content Object Reference Model (SCORM)-compliant courses from external providers or other content providers 108. Customers can create and save their own templates for the various learning elements (learning objects, tests, and so on) that define structural and content-related specifications. These provide authors with valuable methodological and didactical support.

LMS 140 and its implemented methodology typically structure content so that the content is reusable and flexible. For example, the content structure allows the creator of a course to reuse existing content to create new or additional courses. In addition, the content structure provides flexible content delivery that may be adapted to the learning styles of different learners. E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 3, course material 300 may be divided into four structural elements: a course 301, a sub-course 302, a learning unit 303, and a knowledge item 304. Course material 300 may include only some of the described elements and/or other or additional elements. Accordingly, course 301 may comprise contact structured, divided and/or related in any suitable way.

Figure 3:
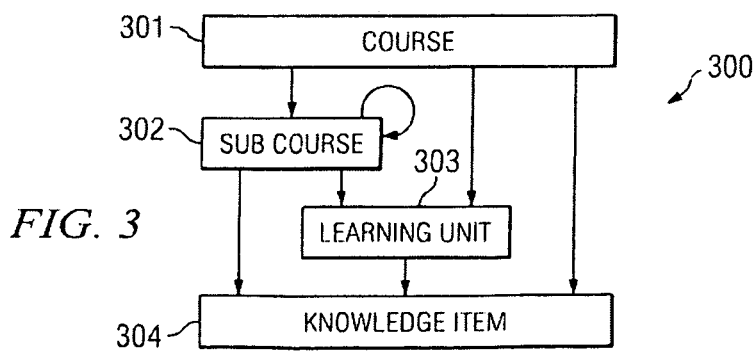
FIG. 3 illustrates an example content aggregation model in accordance with certain embodiments of the learning management system of FIG. 2.

Referring to FIG. 3, starting from the lowest level, knowledge items 304 are the basis for the other structural elements and are the building blocks of the course content structure. Each knowledge item 304 may include content that illustrates, explains, practices, or tests an aspect of a thematic area or topic. Knowledge items 304 typically are small in size (i.e., of short duration, e.g., approximately five minutes or less). Any number of attributes may be used to describe a particular knowledge item 304 such as, for example, a name, a type of media, and a type of knowledge. The name may be used by a learning system to identify and locate the content associated with a knowledge item 304. The type of media describes the form of the content that is associated with the knowledge item 304. For example, media types may include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer-based training, a simulation, and a test.

Knowledge item 304 also may be described by the attribute of knowledge type. For example, knowledge types may include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Knowledge types are described in further detail below.

Knowledge items 304 may be generated using a wide range of technologies, often allowing a browser (including plug-in applications) to be able to interpret and display the appropriate file formats associated with each knowledge item. For example, markup languages (such as HTML, a standard generalized markup language (SGML), a dynamic HTML (DHTML), or XML), JavaScript (a client-side scripting language), and/or Flash may be used to create knowledge items 304. HTML may be used to describe the logical elements and presentation of a document, such as, for example, text, headings, paragraphs, lists, tables, or image references. Flash may be used as a file format for Flash movies and as a plug-in for playing Flash files in a browser. For example, Flash movies using vector and bitmap graphics, animations, transparencies, transitions, MP3 audio files, input forms, and interactions may be used. In addition, Flash allows a pixel-precise positioning of graphical elements to generate impressive and interactive applications for presentation of course material to a learner.

Learning units 303 may be assembled using one or more knowledge items 304 to represent, for example, a distinct, thematically-coherent unit. Consequently, learning units 303 may be considered containers for knowledge items 304 of the same topic. Learning units 303 also may be considered relatively small in size (i.e., duration) though larger than a knowledge item 304.

Sub-courses 302 may be assembled using other sub-courses 302, learning units 303, and/or knowledge items 304. The sub-course 302 may be used to split up an extensive course into several smaller subordinate courses. Sub-courses 302 may be used to build an arbitrarily deep nested structure by referring to other sub-courses 302.

Courses 301 may be assembled from all of the subordinate structural elements including sub-courses 302, learning units 303, and knowledge items 304. To foster maximum reuse, all structural elements may be self-contained and context-free.

Structural elements also may be tagged with metadata that is used to support adaptive delivery, reusability, and search/retrieval of content associated with the structural elements. For example, learning object metadata (LOM), per maps defined by the IEEE "Learning Object Metadata Working Group," may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 4:
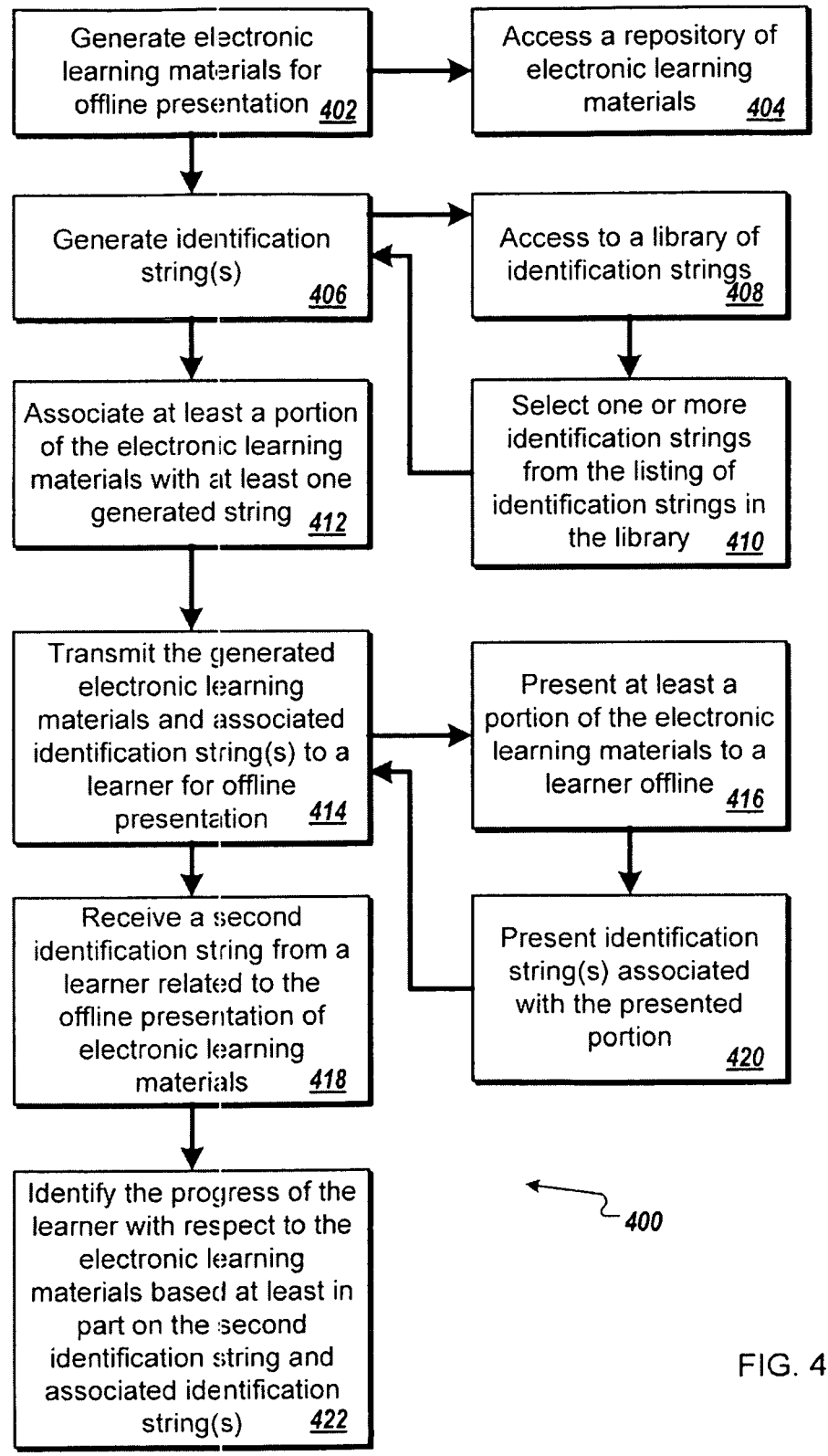
FIG. 4 illustrates an example flow diagram for managing learning materials in accordance with certain embodiments of the learning management system of FIG. 2.

FIG. 4 illustrates a method 400 for managing offline presentation of learning materials in accordance with one embodiment of the disclosure. Although the following description focuses on the operation of learning management system 140, environment 100 contemplates using any appropriate combination and arrangement of logical elements implementing some or all of the desired functionality. In addition, one or more of the described steps may be performed in a different order, modified, combined or omitted. Also, additional steps may be performed without departing from the scope of the present disclosure. Method 400 is described in terms of software environment 100, but it should be understood that any other suitable system or environment may also be used to perform the method 400.

The method 400 begins at step 402 in which electronic learning materials for offline presentation are generated. The learning materials may be generated by the learning management system (e.g., by the management module of learning management system 140) based on various learner attributes such as progress through other learning materials, user selections (e.g., courses selected by the user), and/or information from a training administrator (e.g., courses the learner is required to complete). At step 404, a repository of electronic learning materials is accessed. For example, a user may select a course to complete. The learning management system (e.g., by the management module of learning management system 140) may receive this selection and access and retrieve this course from a repository.

Next, the method proceeds to step 406, in which one or more identification strings are generated. The learning management system (e.g., by the management module of learning management system 140) may generate the identification strings by, for example, generating a sequence of alphanumeric text, selecting the identification string from a stored library, and/or selecting the identification string from a mapping of associations between specified learning materials or portions thereof, identification strings, training identifiers (e.g., identifiers provided by or associated with training administrators), and/or user identifiers. The identification strings may be numbers, letters, or combinations thereof. As illustrated at steps 408 and 410, a library of identification strings may be accessed and one or more identification strings may be selected from the listing of identification strings in the library by the learning management system (e.g., by the management module of learning management system 140). For example, the library may be a listing of words, such as a dictionary or portion thereof. Identification strings may be selected from this listing. A word may be selected as the identification string to facilitate easier reporting by the learner (e.g., a learner may be more likely to record and/or transmit the correct identification string if it is a word familiar to the user).

At step 412, at least a portion of the electronic learning materials are associated with at least one generated identification string. A knowledge item, a learning unit, a sub-course, or the course may be associated with at least one identification string. For example, an identification string may be associated with the first two knowledge items in learning materials. The management module of the learning management system 140 may associate the learning materials and identification strings in for example, a mapping that is stored in a memory coupled to the learning management system.

Next, the method proceeds to step 414, in which the generated electronic learning materials and associated identification string may be transmitted to a learner for presentation offline. For example, the generated electronic learning materials and associated identification string may be transmitted by the learning management system to a learner's computer and stored for later offline presentation. As another example, the generated electronic learning materials and associated identification string may be transmitted and downloaded to a smart phone. In some embodiments, the generated electronic learning materials and associated identification string may be stored on media such as a CD, DVD, or flash memory for transmission to the user.

At step 416, at least a portion of the electronic learning materials are presented to the learner offline. For example, the learner may opt to be presented the electronic learning materials on a television or other media player (e.g., smart phone, iPod, Zune, or Playstation). At step 418, one or more identification strings associated with a presented portion are presented (e.g., on the learner's device or another device). For example, upon completion of a knowledge item, an identification string may be presented. As another example, upon completion of a set of learning units, an identification string may be presented. The identification string may be a word, a set of words, numbers, or combinations thereof.

Next, at step 420, a second identification string is received, from a leaner, that is related to the offline presentation of electronic learning materials. A learner may have been presented with one or more identification strings during the offline presentation of the electronic learning materials. For example, the learner may have been presented a chapter of the learning materials on a Playstation 3, and also been presented with an identification string. The learner may then transmit this presented identification string (e.g., the second identification string) to the learning materials system. The learner may transmit the identification string to the learning management system (e.g., via telephone, via e-mail, via SMS message, via XML message, via other appropriate connections to the server 102, etc.). Thus, the identification string received from the learner may be used by the management module of the learning management system to monitor the progress of the learner with respect to the learning materials.

Proceeding to step 422, the progress of the learner with respect to the electronic learning materials is identified at least partially based on the second identification string and the identification strings associated with the electronic learning materials. For example, the second identification string may be compared, by the identification module of the learning management system 140, to the identification strings associated with the electronic learning materials to identify the progress of the learner. An algorithm may be performed on the second identification string to identify the progress of the learner by the identification module of the learning management system.

In some embodiments, the associations between electronic learning materials and identification strings may be stored in a mapping. Thus, when the second identification string is received, the progress of the learner may be automatically identified by the identification module using the mapping. The mapping may also store user identification information. Thus, for example, an identification string may be personal to a user. One identification string may be associated with various portions of various electronic learning materials; however, the identification string may be associated with a specific portion of an electronic learning material associated with a specified user. Thus, by utilizing the mapping, the progress of the learner with respect to a specified learning material can be identified despite the identification string's association with a plurality of portions of various learning materials. In some embodiments, the identification string may be unique. For example, one identification string may be associated with a specified user and portion of learning materials.

Figure 5:
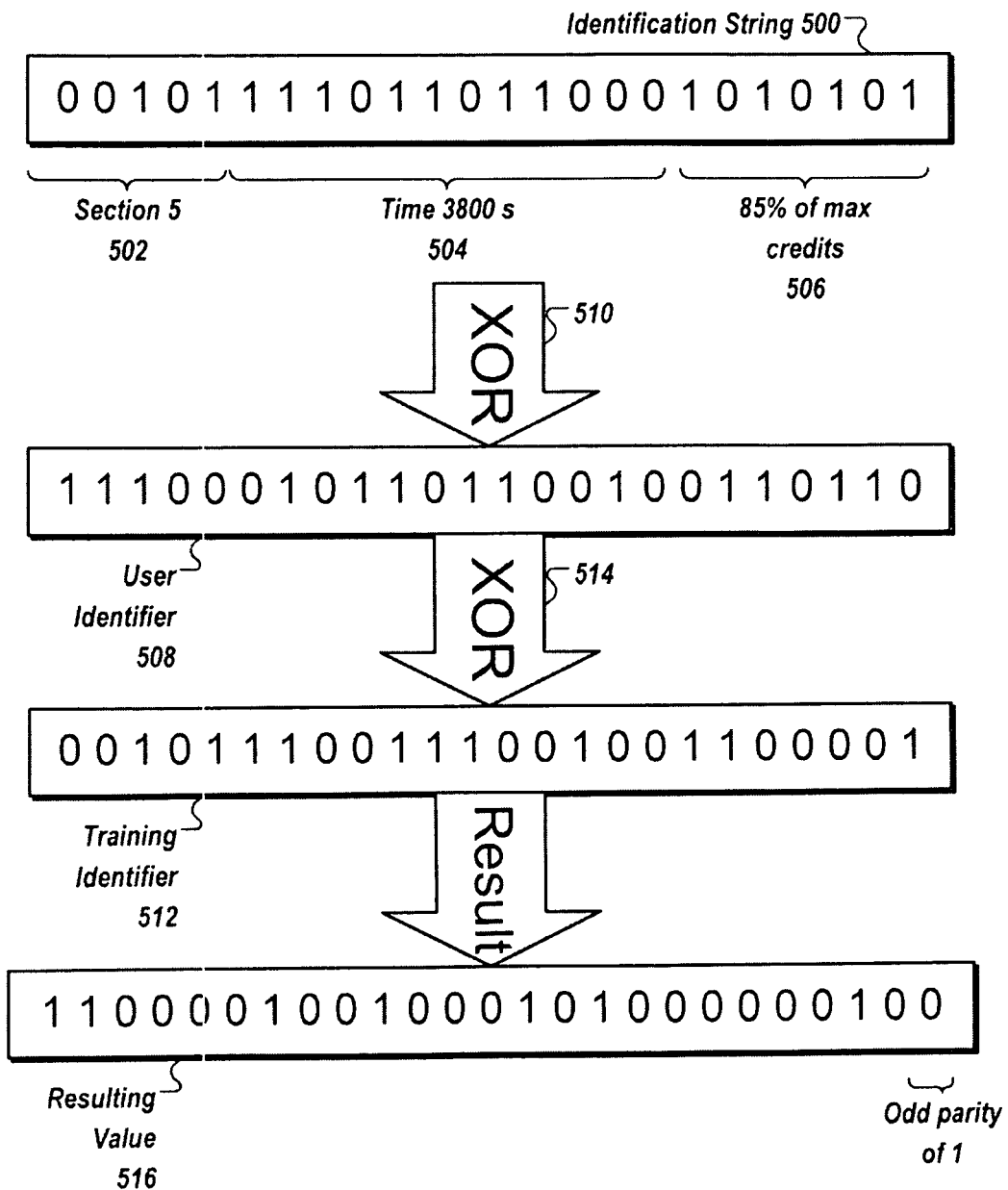
FIG. 5 illustrates an example algorithm for identifying a progress of a learner in accordance with certain embodiments of the learning management system of FIG. 2.

In some embodiments, an algorithm, such as the algorithm illustrated in FIG. 5, may be performed on the second identification string and/or a user identifier. The identification string associated with the electronic materials may include also include an algorithm. For example, the identification string 500 may include a first part 502 associated with the section of the learning materials the learner is being presented, a second part 504 associated with the time spent presenting the section, and/or a third part 506 associated with a score for the section (e.g., based on testing also performed offline). The identification string 500 may be combined with user identifier 508 using an XOR operation 510. Other information such as a training ID 512 may also be combined with the identification string 500 and the user identifier 508 using an XOR operation 514. The resulting value 516 may help identify the progress of the learner through the course.

In some embodiments, the resulting value is generated by a device of the learner and then transmitted to the server 102. The resulting value may be correlated to alphanumeric strings (e.g., A=00000, Z=11001, 0 [zero]=11010). When a learner completes a section, for example, the algorithm may be applied to the identification string and an alphanumeric string may be generated, which is transmitted to the server 102.

Although the above illustration describes a specific embodiment, various other operations may be added, deleted, or modified in other embodiments. For example, to facilitate management of the progress of various learners, the identification strings, user identifiers, progress, associations between identification string and learning materials, times and/or dates, or any other appropriate information may be stored. Thus, the progress of a learner may be monitored. Various reports may also be generated based on the progress of the learner(s), completion of assigned courses, and/or course selections, for example.

As another example, a mapping of the associations of identification strings, electronic learning materials, user identifiers, training identifiers, identification strings received from learners, and/or any other appropriate association may be generated and/or stored in a repository (e.g., repository of server 102). The mapping may facilitate identification of a progress of a user and/or monitoring of the progress of a user. The learning management system may include various modules, such as an identification module and/or a management module to facilitate management of the offline presentations. For example, the identification module of the learning management system may identify a progress of a learner with respect to learning materials presented offline based on identification strings received from a learner and mappings of the associations between identification strings and learning materials. A management module may select at least one identification string from the library and associate the selected identification strings with at least a portion of an electronic learning material. The management module may also monitor the progress of a learner and allow generation of various reports.

Identification strings may be random number generated by the system. The identification strings may include combinations of words and numbers. In some embodiments, the user identifier and an identification string associated with a learning material may be generated. The identification strings may be unique to the electronic learning material or portions thereof, the learner, and/or combinations thereof. Utilizing unique or semi-unique (e.g., identification strings correspond to several portions of various learning materials; but in combination with a user identifier, uniquely correspond to a specific portion of a learning material), may decrease cheating (e.g., using the identification strings presented to another learner).

In some embodiments, a specified number of copies of a learning material may be generated and identification strings may be associated with each copy. The identification string associated with a portion of a copy may be different than the identification string associated with the same portion in the other copies and/or may be the same as the identification string associated with different portions in other copies. For example, an identification string such as "apple" may be associated with the completion of chapter 1 in the first copy and chapter 10 in a different copy. Accordingly, semi-unique identification strings may be correlated to the various copies. When a learner provides the second identification string, the learner may also transmit a code (e.g., number or letters) to identify the copy. Thus, the progress of the learner may be identified based on the second identification string and the copy code. In some embodiments, the same identification string may be associated with the same portion in multiple copies of the leaning materials.

Although learning materials may be presented offline, a user may utilize a connection to the server 102 to transmit the identification string to the system. In some embodiments, the second identification string may be received via a telephone line, an SMS message, an email, an XML message, etc.

While the present disclosure uses a plurality of flowcharts and accompanying descriptions to illustrate the example techniques associated with various methods of FIG. 4, software environment 100 contemplates using or implementing any suitable technique for performing these and other tasks. It will be understood that these techniques are for illustration purposes only and that the described or similar techniques may be performed at any appropriate time, including concurrently, individually, or in combination. In addition, many of the steps in these flowcharts may take place simultaneously and/or in different orders than as shown and described. Moreover, software environment 100 may use processes and methods with additional, few, and/or different steps, so long as the processes and methods remain appropriate.

Although this disclosure has been described in terms of certain implementations and generally associated methods, alterations and permutations of these implementations and methods will be apparent to those skilled in the art. For example, a library of identification strings may be generated by retrieving words from an online dictionary and/or randomly generating numbers. Identification strings may be generated by selecting one or more of the words and/or numbers from the library. As another example, the same identification string may be associated with a specified portion of a learning material. Thus, when specified learning materials are generated, the associated identification string may be identified and, thus, generated with the learning materials. Accordingly, the above description of example implementations does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A computer-implemented method performed by one or more processors for managing training courses for a learner, the method comprising the following instructions:

generating electronic learning materials for offline presentation, wherein the electronic learning materials include a plurality of knowledge items;

prior to transmitting the electronic learning materials to a learner, assigning the plurality of knowledge items to a plurality of identification strings, wherein each of the plurality of knowledge items is mapped to a different identification string in the plurality of identification strings;

storing the assignment between the plurality of knowledge items to the plurality of identification strings;

transmitting to a learner device the generated electronic learning materials and the plurality of identification strings, wherein the plurality of identification strings are presented to the learner during offline presentation in connection with completion of assigned knowledge items;

receiving, from a user device different from the learner device, an identification string from the plurality of identification strings, wherein the identification string is presented to the learner during the offline presentation in connection with completion of an assigned knowledge item in the generated electronic learning materials, and the learner transmits the identification string using the user device different from the learner device; and determining progress of the learner with respect to the generated electronic learning materials based on comparing the received identification string to the stored assignment of identification strings.

2. The method of claim 1 further comprising identifying a listing of words, wherein assigning the plurality of identification strings includes selecting at least one word from the listing of words.

3. The method of claim 1 further comprising receiving, by the one or more processors, a user identifier, wherein determining the progress of the learner is at least partially based on the user identifier.

4. The method of claim 3 further comprising applying an algorithm to the user identifier and the received identification string to produce a resulting value, wherein the identification of the progress of the learner is based at least partially on the resulting value.

5. The method of claim 1 wherein the received identification string is presented to the learner during presentation of the assigned knowledge item.

6. The method of claim 1 further comprising:

generating a plurality of copies of the electronic learning materials; and associating at least one of the identification strings with at least a portion of each copy of the electronic learning materials, wherein the identification string associated with a portion of one copy of the electronic learning materials is different from the identification string associated with same knowledge items of other copies of the electronic learning materials.

7. The method of claim 6 wherein the identification string associated with one copy of the electronic learning materials is different from the identification strings associated with other copies of the electronic learning materials.

8. The method of claim 1 further comprising:
presenting at least a portion of the electronic learning materials to the learner; and
presenting one or more of the assigned identification strings based on the portion of the electronic learning materials presented to the learner.

9. The method of claim 1 further comprising receiving, by the one or more processors, a user identifier, wherein determining the progress of the learner is at least partially based on the user identifier.

10. Software for managing offline presentation of electronic learning materials, the software comprising computer readable instructions embodied on tangible media and operable when executed to:
generate electronic learning materials for offline presentation, wherein the electronic learning materials include a plurality of knowledge items;
assign the plurality of knowledge items to a plurality of identification strings, wherein each of the plurality of knowledge items is mapped to a different identification string in the plurality of identification strings;
store the assignment between the plurality of knowledge items to the plurality of identification strings;
transmit to a learner device the generated electronic learning materials and the plurality of identification strings, wherein the plurality of identification strings are presented to the learner during offline presentation in connection with completion of assigned knowledge items;
receive, from a user device different from the learner device, an identification string from the plurality of identification strings, wherein the identification string is presented to the learner during the offline presentation of in connection with completion of an assigned knowledge item in the generated electronic learning materials, and the learner transmits the identification string using the user device different from the learner device; and
determine progress of the learner with respect to the generated electronic learning materials based on comparing the received identification string to the stored assignment of identification strings.

11. The software of claim 10 further operable to identifying a listing of words, wherein assigning the plurality of identification strings includes selecting at least one word from the listing of words.

12. The software of claim 10 further operable to receive a user identifier, wherein determining the progress of the learner is at least partially based on the user identifier.

13. The software of claim 10 wherein the received identification string is presented to the learner during presentation of the assigned knowledge item.

14. The software of claim 10 further operable to:
generate a plurality of copies of the electronic learning materials; and
associate at least one of the identification strings with at least a portion of each copy of the electronic learning materials, wherein the identification string associated with a portion of one copy of the electronic learning materials is different from the identification string associated with same knowledge items of other copies of the electronic learning materials.

* * * * *